UNITED STATES PATENT OFFICE.

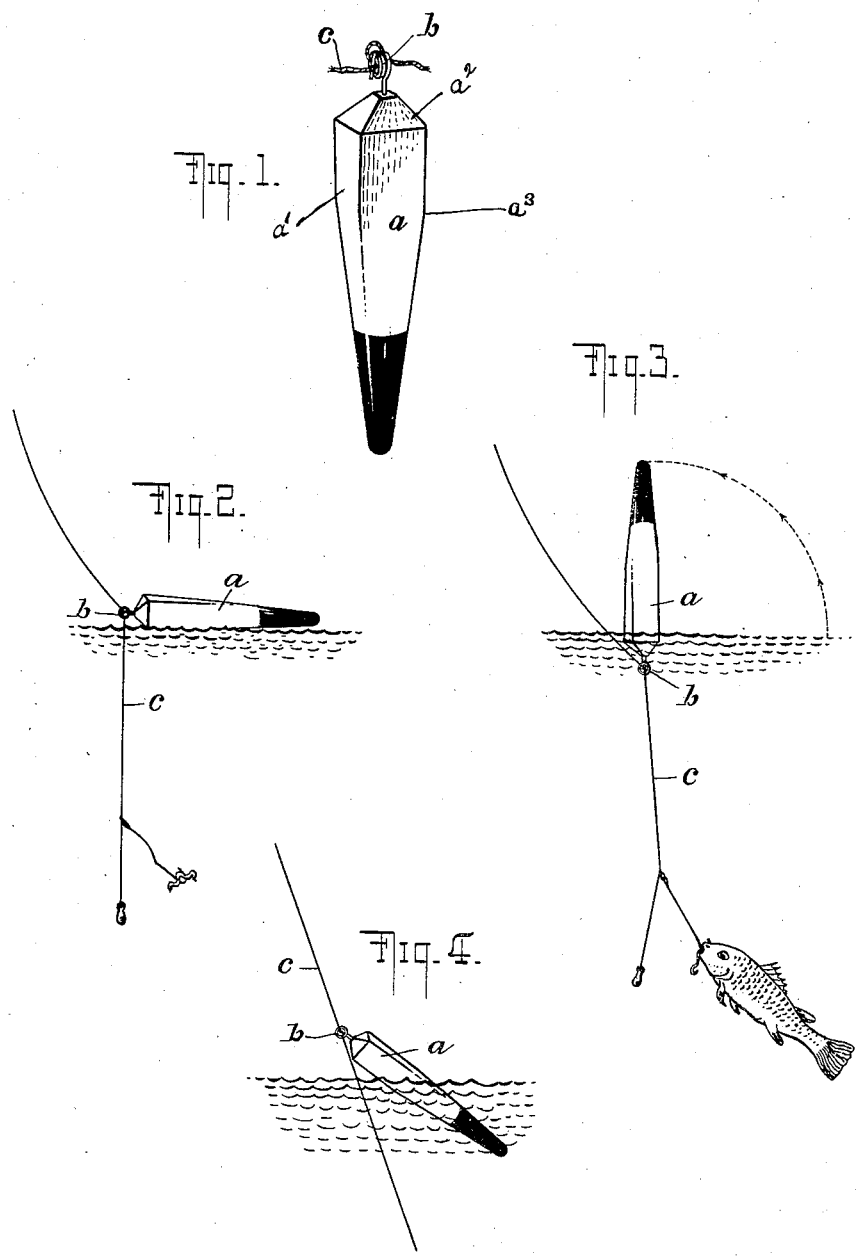

JOHN E. L. BEALS, OF NEW YORK, N. Y., ASSIGNOR OF ONE-HALF TO HENRY A. HART, OF NEW YORK, N. Y., (FLUSHING.)

FLOAT FOR FISHING.

1,065,204.  Specification of Letters Patent.  Patented June 17, 1913.

Application filed April 17, 1912. Serial No. 691,344.

*To all whom it may concern:*

Be it known that I, JOHN E. L. BEALS, a citizen of the United States, and a resident of Flushing, county of Queens, city and State of New York, have invented a new and useful Improvement in Floats for Fishing, of which the following is a specification.

My invention relates to floats, for fishermen's use, of the kind that are commonly attached to a single line as used with or without a rod.

The object of my invention is to provide an improved form of float which can be easily attached or detached from the line; which can be easily adjusted upon the line with reference to its distance from the end thereof; which shall be extremely sensitive; which will not kink or twist the line; and which can be drawn from the water when the fish is "struck" with but very little drag.

Other incidental advantages will appear as the specification proceeds.

In the drawings, Figure 1 represents a perspective view of a preferred form of my improved float with the line broken away; Fig. 2 represents the same float as it appears in use when the fisherman is waiting for a "bite"; Fig. 3 is similar to Fig. 2 but shows the float as it appears just after the fish has taken the bait; and Fig. 4 shows the float and a portion of the line as the latter is being drawn from the water.

In the drawings the float comprises a straight body $a$ of wood, the butt end portion $a'$ of which is square in section except at the extreme tip which is beveled on each of the four sides to provide a very flat pyramid, $a^2$, at the flattened apex of which is an eye $b$ to which the line $c$ is attached. Preferably this eye is formed of a short length of wire, one end of which is fixed in the body of the float and the other wound in two or three convolutions so that the line may be slipped between the convolutions and fastened to the eye without actually being passed through said eye. Beginning at a point $a^3$ at the end of the butt end portion having a distance from the base of the pyramid about equal to the width of the butt, the body is given a taper gradually becoming conical to the other end; this part of the body I call the "tapered portion."

My float is, preferably, about six to seven times as long as it is wide.

In use, when the line is in the water and waiting for a "bite" the float lies upon the surface of the water as shown in Fig. 2; the tapered portion of the float lies somewhat above the surface, while the butt end displaces some of the water. Owing to the square section of the butt, the float has practically no tendency to roll upon the water so that the line does not tend to become twisted and kinked.

In fishing from the side of an anchored boat, as the boat will naturally set itself in the direction of the wind, and as it is clear that the float will do likewise, both boat and float will be parallel to one another so that the float is very conspicuous.

My float is extremely sensitive and tends to take the position of Fig. 3 for a very slight pull of the fish upon the line. This sensitiveness is mainly owing to the fact that the float behaves as a lever, the fulcrum of which is very close to the heavy or butt end of the float. The float pivots about its lever so that its smaller and lighter end describes a large arc for a very small movement of the butt.

In pulling the line from the water, the float rises easily and much as indicated in Fig. 4. There is no broad side pull of the float against the water, but, on the contrary, the float tends to slip from the water along the line of its length.

I find that the best results are obtained with my float when its surface is very smooth and impervious to water. To secure this result I coat the float with enamel. By using a red, black or other conspicuous color for the outer end of the float, I make the same very conspicuous.

While I prefer wood, it is not essential that such material be used in order to make my improved float, and instead I may use cork or other suitable light material. Or I may form my float from sheet metal, the same being made so that it is water tight, or other materials may be used.

While I prefer that the butt of my float be square in section a three sided or five sided butt or any other style of butt which provides flat sides may be employed within the scope of my invention.

As described, my improved float because of its tapered portion decreases correspondingly in weight from the larger to the smaller end of said taper. The purposes of the invention may also be secured, although not so advantageously, by substituting a cylinder for the tapered portion the weight of said cylinder being varied from a maximum adjacent to the butt to a minimum at the outer end of the float.

Having described my invention, I claim:

1. A straight bodied float, having a butt end portion of uniform cross section, diminishing in cross section from said butt end portion to the other end, and having line attaching means at the butt end portion.

2. A straight bodied float, having a butt end portion of uniform cross section, tapered from said butt end portion to the other end, and having line attaching means at the butt end portion.

3. A straight bodied float comprising a square sectioned butt end portion, a tapered portion adjacent to said butt end portion, and having line attaching means at the end of the butt opposite said tapered portion.

4. A straight bodied float having a smooth surface impervious to water, comprising a butt end portion of uniform cross section, a tapered portion adjacent to said butt, and having line attaching means at the end of the butt opposite said tapered portion.

5. A straight bodied float comprising one portion, the weight of which increases from a minimum at its end to a maximum adjacent the butt, and a butt end portion of uniform section which section is at least as great as any section of said first named portion, said butt end portion being provided with line attaching means.

6. A straight bodied float of homogeneous material such as wood, provided with a smooth surface impervious to water, and comprising a square sectioned butt having line attaching means at the end thereof and a conically tapered portion adjacent to said butt.

7. A straight bodied float, having a butt of uniform cross section at one end, diminishing in weight per unit length from said butt end portion to the other end of the float, and having line attaching means at the butt.

8. A straight bodied float, having a butt of uniform cross section at one end diminishing in cross section and in weight per unit length from said butt to the other end of the float, and having line attaching means at the butt end.

9. A straight bodied float, flat sided at the butt and having a tapered portion which gradually becomes conical adjacent to said butt, said butt being provided with line attaching means.

10. A straight bodied float of homogeneous material, provided with a smooth surface impervious to water, comprising a flat sided butt the tip of which is pyramidal and has line attaching means at the apex thereof, and a tapered portion adjacent to said butt.

In testimony whereof I have hereunto set my hand in the presence of two subscribing witnesses.

JOHN E. L. BEALS.

Witnesses:
HANS V. BRIESEN,
JOHN A. KEHLENBECK.